United States Patent [19]
Schulten et al.

[11] 3,932,599
[45] Jan. 13, 1976

[54] METHOD OF OBTAINING HYDROGEN FROM STEAM

[75] Inventors: Rudolf Schulten, Richterich; Johannes Teggers, Wesseling; Roland Schulze Bentrop, Bonn, all of Germany

[73] Assignee: Rheinische Braunkohlenwerke Aktiengesellschaft, Cologne, Germany

[22] Filed: Feb. 25, 1975

[21] Appl. No.: 552,828

[30] Foreign Application Priority Data
Mar. 1, 1974 Germany.......................... 2409762

[52] U.S. Cl. ................ 423/655; 423/415; 423/522; 423/529; 423/539; 423/579; 423/656
[51] Int. Cl.².... C01B 1/02; C01B 1/08; C01B 13/02
[58] Field of Search .......... 423/656, 655, 529, 522, 423/415 A, 532, 542, 579, 533, 539

[56] References Cited
UNITED STATES PATENTS
1,330,772  2/1920  Bosch et al. ........................ 423/656
1,797,426  3/1931  Larson ................................ 423/656
2,147,780  2/1939  Von Kahler ........................ 423/656

OTHER PUBLICATIONS
J. W. Mellor's book "A Comp. Treatise on Inorganic and Theo. Chem.," Vol. 10, 1930, p. 222, Longmans, Green & Co., New York, Copy Scient. Lib.

*Primary Examiner*—Edward Stern
*Attorney, Agent, or Firm*—Seidel, Gonda & Goldhammer

[57] ABSTRACT

A method of obtaining hydrogen from water in a multi-stage circulatory process avoids the need to use solid inorganic salts as auxiliary products by using only gases and liquids in the reaction stages. Carbon monoxide is reacted catalytically with steam producing carbon dioxide and hydrogen; the carbon dioxide is reacted with steam and sulphur dioxide to give sulphuric acid and carbon monoxide; the sulphuric acid is split into sulphur trioxide and steam; the sulphur trioxide is dissociated into oxygen and sulphur dioxide. The CO and $SO_2$ are fed back into the process, and hydrogen and oxygen obtained as end products.

1 Claim, 1 Drawing Figure

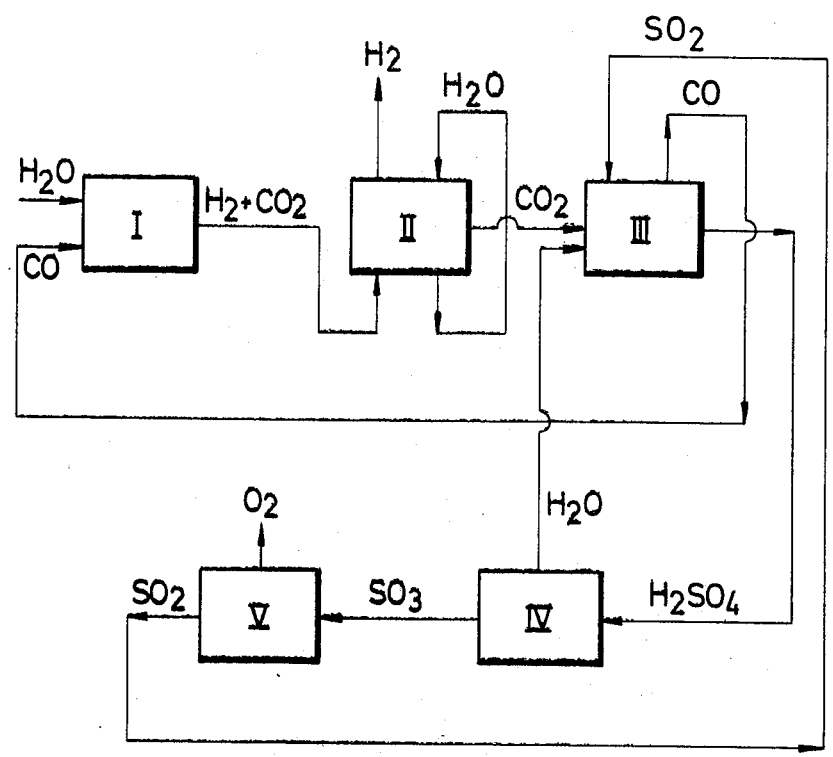

METHOD OF OBTAINING HYDROGEN FROM STEAM

FIELD OF THE INVENTION

This invention relates to a method of obtaining hydrogen from water in a multi-stage circulatory process.

DESCRIPTION OF THE PRIOR ART

In view of the increased need for the generation of energy, in recent years methods for obtaining hydrogen have been proposed in which hydrogen is obtained from water in multi-stage circulatory processes involving conversion and decomposition with inorganic metallic salts, for example iron and copper compounds. Because of the use of such auxiliary materials in the carrying out of the circulatory process all these known processes suffer from the serious disadvantage that in carrying them out each part by weight of hydrogen which is obtained requires a very large amount by weight of the inorganic metallic salt to be kept in circulation.

SUMMARY OF THE INVENTION

This disadvantage can be avoided in a simple way if chemical conversion processes are used in which only gases and liquids take part and which do not involve the use of any inorganic salts. Such a process forms the basis of the present invention.

Accordingly, in accordance with the present invention, there is provided a method of obtaining hydrogen from water in a multi-stage circulatory process, in which carbon monoxide is reacted catalytically with steam to produce carbon dioxide and hydrogen; the carbon dioxide is reacted with water and sulphur dioxide at increased temperature and pressure to produce sulphuric acid and carbon monoxide; the sulphuric acid through an intermediate stage of conversion to sulphur trioxide is dissociated into sulphur dioxide, oxygen and steam by heat treatment; the carbon monoxide and sulphur dioxide which are obtained are fed back in the circulatory process into the appropriate reaction stages; and the hydrogen and the oxygen are obtained as end products.

DESCRIPTION OF THE PREFERRED EMBODIMENT

The catalytic reaction of carbon monoxide with steam, the so-called converter process, is already carried out on a large scale. The process is carried out for example at a temperature of 300° to 500°C under normal pressure or under increased pressure and in the presence of for example iron catalysts. The separation of the carbon dioxide from the converter gas has likewise already been carried out on a large scale, for example with the aid of a water washing plant or by washing with organic solvents, the washing agent generally being reused after a regeneration step. The reaction of the obtained carbon dioxide with water and sulphur dioxide is preferably carried out at increased pressure, for example 20 to 750 atmospheres, and more particularly 100 to 600 atmospheres, as well as at increased temperature for example 100° to 650°C or higher, possibly in the presence of catalysts. The carbon monoxide which results therefrom can be separated off for example by condensation of the sulphuric acid, the sulphuric acid then being able to be concentrated in known manner by evaporation, for example under reduced pressure. Subsequently, the sulphuric acid is dissociated into sulphur trioxide and steam by heating at high temperature, for example 450°C. In a further method step the sulphur trioxide is dissociated into sulphur dioxide and oxygen, for example by heating at a temperature of about 800°C or higher. It is possible to carry out this dissociation in the presence of catalysts, for example catalysts containing noble metals. The resulting gas mixture is then rapidly cooled to a temperature of less than about 300°C. The sulphur dioxide is subsequently obtained in known manner at about 20°C, for example by condensation. The remaining oxygen is removed from the process. The carbon monoxide which is obtained during the course of the process is fed back into the converter stage in the circulatory process and the sulphur dioxide is likewise fed back into the carbon dioxide conversion stage. Since only gases and liquids are involved in the conversion stages, the weight of auxiliary materials circulating per unit weight of extracted hydrogen is kept much lower than is the case if one uses solid inorganic salts, as well as being considerably cheaper. The heat used in the process, particularly for the dissociation of sulphur trioxide into sulphur dioxide and oxygen, can with advantage be the heated coolant from a high-temperature nuclear reactor for example.

The multi-stage circulatory process of the present invention is shown schematically by way of example in the accompanying drawing. In the process stage I (converter stage) steam and carbon monoxide are transformed catalytically to carbon dioxide and hydrogen. This gas mixture is fed into a regenerative washer II in which by washing with water and regeneration of the wash waters by pressure reduction there occurs a separation of the carbon dioxide from the hydrogen. The hydrogen is removed as an end product from the process, and the carbon dioxide is fed to stage III where the conversion with sulphur dioxide in aqueous solution at increased pressure and high temperature to sulphuric acid and carbon monoxide takes place. The carbon monoxide is set free by expansion, i.e., pressure reduction, of the gaseous mixture and is fed back into stage I. The sulphuric acid is concentrated in stage IV, primarily by evaporation techniques, and then is split into sulphuric trioxide and steam at increased temperature, the latter being returned to stage III. Subsequently, in stage V the sulphur trioxide is split into sulphur dioxide and oxygen by heating. Through quenching of the gas mixture and subsequent pressure condensation of the sulphur dioxide at low temperature the oxygen is separated and can be removed from the process. The sulphur dioxide is returned in the circulatory process to stage III.

We claim:

1. A method of obtaining hydrogen from steam in a multi-stage circulatory process, in which in a first reaction stage carbon monoxide is reacted catalytically with steam at a temperature of 300° to 500°C to produce carbon dioxide and hydrogen; and in a second reaction stage the carbon dioxide is reacted with water and sulphur dioxide at a temperature of 100° to 650°C and at a pressure of 20 to 750 atmospheres to produce sulfuric acid and carbon monoxide; the sulfuric acid through an intermediate stage of conversion to sulfur trioxide is dissociated into sulphur dioxide, oxygen and steam by heat treatment; the carbon monoxide which has been obtained is recycled back into the first reaction stage, and the sulphur dioxide which has been obtained is recycled back into the second reaction stage; and the hydrogen and oxygen obtained as end products are separately recovered.

* * * * *